(12) United States Patent
Tran

(10) Patent No.: US 11,130,868 B2
(45) Date of Patent: Sep. 28, 2021

(54) PAINT MIXTURE AND LINT REMOVAL METHOD

(71) Applicant: KOHEI LIMITED COMPANY, Fujinomiya (JP)

(72) Inventor: Ai Van Tran, Fuji (JP)

(73) Assignee: KOHEI LIMITED COMPANY, Fujinomiya (JP)

( * ) Notice: Subject to any disclaimer, the term of this patent is extended or adjusted under 35 U.S.C. 154(b) by 166 days.

(21) Appl. No.: 16/200,772

(22) Filed: Nov. 27, 2018

(65) Prior Publication Data

US 2019/0161622 A1   May 30, 2019

(30) Foreign Application Priority Data

Nov. 27, 2017   (JP) .............................. JP2017-226568

(51) Int. Cl.
| | |
|---|---|
| C09D 5/00 | (2006.01) |
| C09D 133/10 | (2006.01) |
| C09D 163/00 | (2006.01) |
| D21H 21/52 | (2006.01) |
| D21H 19/58 | (2006.01) |
| C09D 7/40 | (2018.01) |
| D21H 19/38 | (2006.01) |
| D21H 27/00 | (2006.01) |

(52) U.S. Cl.
CPC ................ *C09D 5/00* (2013.01); *C09D 7/69* (2018.01); *C09D 133/10* (2013.01); *C09D 163/00* (2013.01); *D21H 1/00* (2013.01); *D21H 19/385* (2013.01); *D21H 19/58* (2013.01); *D21H 21/52* (2013.01)

(58) Field of Classification Search
None
See application file for complete search history.

(56) References Cited

U.S. PATENT DOCUMENTS

| | | | | |
|---|---|---|---|---|
| 6,383,271 B1 * | 5/2002 | Schmidt | .................... | C09C 3/00 |
| | | | | 106/14.41 |
| 2015/0325320 A1 * | 11/2015 | Tran | ........................ | G21F 5/005 |
| | | | | 588/4 |
| 2017/0015837 A1 * | 1/2017 | Takaoka | .................. | C23C 22/73 |

FOREIGN PATENT DOCUMENTS

| | | |
|---|---|---|
| DE | 198 51 878 A1 | 5/2000 |
| EP | 3 013 278 B1 | 2/2018 |
| JP | 49-54293 A | 5/1974 |
| JP | 01-225796 A | 9/1989 |
| JP | 11-061141 A | 3/1999 |
| JP | 2001-219488 A | 8/2001 |
| JP | 2001-220518 A | 8/2001 |
| JP | 2002-292350 A | 10/2002 |
| JP | 2003-104596 A | 4/2003 |
| JP | 2005-087925 A | 4/2005 |
| JP | 2005-146120 A | 6/2005 |
| JP | 2007-015797 A | 1/2007 |
| JP | 2010-042617 A | 2/2010 |
| JP | 2013-068459 A | 4/2013 |
| JP | 2013-202139 A | 10/2013 |
| JP | 2014-055396 A | 3/2014 |
| WO | 2014/206439 A1 | 12/2014 |

OTHER PUBLICATIONS

Extended European Search Report dated Apr. 12, 2019 in European Application No. 18200647.8.

* cited by examiner

*Primary Examiner* — Sheeba Ahmed

(74) *Attorney, Agent, or Firm* — Sughrue Mion, PLLC

(57) ABSTRACT

The present invention provides a paint mixture containing a paint and paper sludge-derived sintered carbonized porous grains, the use of the paint mixture for removing lint, a composite structure containing the paint mixture and a lint removal method for the paper machine in the papermaking process, for the printing and/or copying process, and for the electric control panels in the papermaking mill to prevent piling and sticking troubles and/or fire breakout caused by lint generated during the operation of paper machine and equipment in the paper converting process. The provided paint mixture and method also reduces paper breakages of the paper machine. The provided paint mixture and method is composed of preparation of a mixture of paint and paper sludge-derived sintered carbonized porous grains and then paint, e.g., machines and/or equipment located after the Yankee dryer, steel pipe handrails in a household papers manufacturing mill.

19 Claims, No Drawings

PAINT MIXTURE AND LINT REMOVAL METHOD

BACKGROUND OF THE INVENTION

1. Field of the Invention

The present invention relates to 1) a paint mixture containing paper sludge-derived sintered carbonized porous grains, 2) the use of the paint mixture for removing lint, 3) a composite structure containing the paint mixture and 4) a method for removing lint, which is a problem commonly encountered in the paper manufacturing industry as well as its related industries such as paper converting, printing, copying and the like. Particularly, the present invention relates to a method for removing lint, in which the removal efficiency is greatly enhanced by using paper sludge-derived sintered carbonized porous grains.

2. Description of the Related Art

Newsprint, magazine paper containing chemical pulp of less than 40%, coated paper, fine paper in roll form or cut-size form to be used for making book or notebook, corrugated paper and paperboard for container and boxes and the like are manufactured daily. Newsprint is made of groundwood pulp (GP) or thermomechanical pulp (TMP) from softwood or hardwood, and de-inked pulp (recycled pulp) from old newspapers and inserts, or the like. Fine paper such as plain copying paper, coated paper is made of kraft pulp with low Kappa number manufactured by the chemical kraft cooking process, and deinked pulp produced from old magazines, mixed office wastes (MOW). These pulps are usually chlorine-free bleached and as such chlorine and sodium (calcium) hypochlorite are not used in their bleaching process. Corrugated paper and paperboard for container and boxes and the like, with or without bleaching, are manufactured by the kraft pulping process resulting in chemical pulp with high Kappa number, and by the re-use of the residues from the manufacture process of paperboard and corrugated paper (OCC: old corrugated carton).

In addition to the various papers mentioned above, there is the other type of papers such as sanitary (household) papers. This kind of paper is manufactured from bleached kraft pulp with an ISO brightness of not less than 80%, bleached deinked pulp from recycled old magazines and MOW with an ISO brightness of not less than 70%, or a mixture thereof.

Lint is mainly ray cells of softwood and hardwood, has a small specific surface area of less than 2.5 $m^2/g$, and a poor binding capability to the paper web. Therefore, lint is easily removed from the surface of a paper sheet after drying. Furthermore, fibers with a length of 10 to 100 μm are also defined as lint because they have a low binding capability to a paper web. In the papermaking process, a large amount of lint is generated from the process of trimming a paper web from the paper machine and the process of cutting a paper roll from a paper web, and thus these processes are the generation source of the lint.

During the offset printing process of newsprint, the piling and sticking troubles are often encountered. This is due to the lint on the blanket. One way to solve these problems is to use a calcium carbonate with improved specific quality as a filler. (PTL 1).

Another way to solve the problem of piling and sticking troubles due to lint on the printing press, or the printing web paper, is that the lint adhering to a fiber belt formed by wrapped brushed fibers and stretched between the web driving roller and the tension roller, is removed by a rotary brush installed on the tension roller (PTL 2).

Lint attached to the edge of the surfaces of cut sheets of corrugated board paper or paperboard, may adhere to the blanket of the printing press during their transfer to the printing press and thus may cause the piling and sticking troubles. The problem can be solved by using a rotary brush to remove adhering lint (PTL 3).

In the printing process of roll paper (PTL 4) and cut sheet paper (PTL 5), a rotary brush is provided during the transfer of these papers to the printing press, and lint adhering to the edge of the surfaces of these fine papers is then removed.

Concerning the removal of lint of sanitary (household) paper, a static electricity charge-eliminating brush is installed on one side of the transfer path of the sanitary (household) paper. On the other side of the transfer path of the sanitary (household) paper, an air discharge port is installed. From this port air is blown toward one side of the sanitary (household) paper and as the blown air passed through the paper, lint on the paper surface is sucked by the static electricity charge-eliminating brush mentioned above. Thus, the lint is easier to be removed and as such is readily discharged from the system (PTL 6).

PTL 1 to PTL 6 described above disclose measures for operational improvement against troubles due to lint in a paper sheet-forming process or a printing process. However, in the manufacture of corrugated board sheet, lint is easily attached and accumulated on the corrugator. This, in turn, would increase the load on the high-speed rotary machine of the corrugator, and thus may result in a work stoppage. Also, there is a concern that a fire may break out in a place where heat generation and ignition are caused by static electricity and friction. Therefore, a liquid refrigerant is supplied to the suction port of the suction blower on the corrugator or a duct should be provided on the upstream of the suction blower to prevent fire accident due to lint or mechanical malfunction (PTL 7).

In February 1995, a fire broken out in a household paper manufacturing mill in Akahira city in Hokkaido. Although the cause of the fire is not definitely determined, there are two hypotheses. The first one is that lint accumulated in the duct of a dust collector remained there for a long time and then became dried, carbonized, and ignited. The second one is that the action of the release doctor during the release process of the paper sheet from the Yankee dryer on the paper machine, might make lint in the dust collector of this system ignite and then explode (Japan Industrial Safety and Health Association, Japan Advanced Information Center of Safety and Health, Work-related fire case No. 1055, Japan Industrial Safety and Health Association website).

Furthermore, according to the proceedings of the 2006 Annual Conference of the International Association of Engineering Insurers (IMIA), a fire due to leakage of electricity (short circuit) of an electrical control panel broke out in a tissue paper manufacturing mill in Switzerland and caused damage amounting to about 15 billion yen. Similarly, in November 2016 a fire broken out in the converting plant of a household paper manufacturing mill in Kawasaki city, Kanagawa prefecture, which produces toilet paper, tissue paper, kitchen paper, and the like. It was determined that lint accumulated and remained for a long time in an electrical control panel was assumed to be dried, carbonized, and ignited by leakage of electricity.

RELATED ART DOCUMENTS

Patent Literature

PTL 1: Japanese Unexamined Patent Application Publication No. 2014-055396
PTL 2: Japanese Unexamined Patent Application Publication No. 2007-015797
PTL 3: Japanese Unexamined Patent Application Publication No. 2005-087925
PTL 4: Japanese Unexamined Patent Application Publication No. 2003-104596
PTL 5: Japanese Unexamined Patent Application Publication No. 2002-292350
PTL 6: Japanese Unexamined Patent Application Publication No. 2013-202139
PTL 7: Japanese Unexamined Patent Application Publication No. 2001-219488

SUMMARY OF THE INVENTION

The present invention provides a paint mixture containing paper sludge-derived sintered carbonized porous grains, the use of the paint mixture for removing lint, a composite structure containing the paint mixture and a method for preventing troubles, such as piling and sticking, and fire due to lint generated by, for example, a paper machine in the papermaking process of a paper mill, a paper converting plant including the printing process, and/or an electrical control panel in a paper mill, thereby the number of breakages of the paper web on the paper machine will be greatly reduced.

The present invention provides the following [1] to [15].
[1] A paint mixture comprising a paint and paper sludge-derived sintered carbonized porous grains.
[2] The paint mixture according to [1], wherein the paper sludge-derived sintered carbonized porous grains contain 5 to 40 wt %, on a dry weight basis, of combustibles including carbon and 60 to 95 wt %, on a dry weight basis, of incombustibles, have a median size D50 of not more than 100 µm and a volume porosity of not less than 50% and are obtainable by sintering and carbonizing a paper sludge in a reducing carbonization sintering furnace at a carbonization temperature of 500° C. to 1,300° C.
[3] The paint mixture according to [2], wherein the paper sludge-derived sintered carbonized porous grains contain 15 to 40 wt %, on a dry weight basis, of combustibles including carbon and 60 to 85 wt %, on a dry weight basis, of incombustibles, have a median size D50 of not more than 20 µm and a volume porosity of not less than 70% and are obtainable by sintering and carbonizing a paper sludge in a reducing carbonization sintering furnace at a carbonization temperature of 500° C. to 1,300° C.
[4] The paint mixture according to any of [1] to [3], wherein the paint includes an epoxy resin or an acrylic resin curing agent made of methacrylate polymer.
[5] A composite structure comprising a painting target and a paint layer containing a paint mixture as described in any of [1] to [4].
[6] The composite structure according to [5], wherein the painting target is made of iron, stainless steel, aluminum, or brass.
[7] The composite structure according to [5] or [6], wherein the painting target is a metal surface of a machine or equipment located after the dryer process of a paper machine, a machine or equipment in a paper converting process including the printing press, or electric control panels in the papermaking mill.
[8] The composite structure according to any of [5] to [7], comprising an underlayer between the painting target and the paint layer, wherein the underlayer does not contain the paper sludge-derived sintered carbonized porous grains.
[9] The composite structure according to [8], wherein the painting target is made of stainless steel, the underlayer is obtainable by using only acrylic resin curing agent made of methacrylate polymer, and the paint layer is obtainable by using a paint mixture containing an epoxy resin paint.
[10] The composite structure according to any of [5] to [9], wherein the painting target has been pretreated by rubbing the painting target with an industrial nonwoven fabric surface treatment material or any of abrasive papers #20 to #100.
[11] The use of a paint mixture of any of [1] to [4] for preventing lint from adhering to a paint target.
[12] A method for removing lint comprising painting a painting target with a paint mixture as described in any of [1] to [4] to prevent lint from adhering to the painting target.
[13] The method for removing lint according to [12], wherein a composite structure as described in any of [5] to [10] is obtained.
[14] The method for removing lint according to [12] or [13], wherein the painting target is made of stainless steel, aluminum, or brass, and the method includes a pretreatment comprising rubbing the painting target using an industrial nonwoven fabric surface treatment material or any of abrasive papers #20 to #100.
[15] The method for removing lint according to [12] or [13], wherein the painting target is made of stainless steel, and the method includes a pretreatment of rubbing the painting target with an industrial nonwoven fabric surface treatment material or any of abrasive papers #20 to #100; painting the underlayer using only acrylic resin curing agent made of methacrylate polymer; and subsequently painting the paint mixture on the underlayer.

To achieve the above objective, a method for removing lint according to the present invention would include the painting using a paint mixture in which paper sludge-derived sintered carbonized porous grains are mixed with a paint to prevent lint from adhering to the target to be painted.

In the method for removing lint according to the present invention, the paper sludge-derived sintered carbonized porous grains contain not less than 60% of incombustibles other than combustibles and its particles have a median size D50 of not more than 20 m. The median size D50 of the particles was determined using a Belsorp-mini II (Microtrac-BEL Corp.).

In the method for removing lint according to the present invention, the painting target is made of iron, stainless steel, aluminum, or brass.

In the method for removing lint according to the present invention, in the case that the painting target is made of stainless steel, aluminum, or brass, the method includes a pretreatment step of rubbing the painting target using industrial nonwoven fabric surface treatment materials or abrasive papers #20 to #100.

In the method for removing lint according to the present invention, the paint includes an epoxy resin or an acrylic resin curing agent made of methacrylate polymer.

In the method for removing lint according to the present invention, the painting target is of stainless steel, and the method includes a pretreatment step of rubbing the painting target using industrial nonwoven fabric surface treatment materials or abrasive papers #20 to #100; and after the pretreatment step, only acrylic resin curing agent made of methacrylate polymer, and without the use of paper sludge-derived sintered carbonized porous grains, is applied as the underlayer painting; whereas the upper layer painting is a mixture of paper sludge-derived sintered carbonized porous grains and epoxy resin-based paint.

In the method for removing lint according to the present invention, the underlayer painting and/or the upper layer painting is/are applied for more than once.

In the method for removing lint according to the present invention, the paint mixture is applied for more than once.

In the method for removing lint according to the present invention, the paint mixture is diluted using tap water when the paint mixture is a water-based paint, and the paint mixture is diluted using a thinner when the paint mixture is a solvent-based paint.

In the method for removing lint according to the present invention, the painting target is the metal surface of mechanical equipment located after the dryer of the paper machine, the metal surface of mechanical equipment of the paper converting plant including printing equipment, and the electrical control panel.

Advantageous Effects of Invention

The paint mixture and the method for removing lint as described in the present invention prevents troubles, such as piling and sticking, and fire due to lint generated by, for example, a paper machine in the papermaking process of a paper mill, a paper converting plant including the printing process, and/or an electrical control panel in a paper mill, thereby the number of breakages of the paper web on paper machine, especially Yankee dryer, would be greatly reduced and fire would not occur. Thus, the cost and practicality of the invention are comprehensively satisfied, and such a reliable and safe application can be easily carried out practically.

DESCRIPTION OF THE PREFERRED EMBODIMENTS

The inventor of the present invention painted an iron plate, a stainless steel plate (SUS 304), an aluminum plate, and the like; the sizes of all plates were 900 mm (width)× 1,800 mm (height)×6 mm (thickness) using a paint mixture composed of paper sludge-derived sintered carbonized porous grains (paper sludge carbon (hereinafter, referred to as "PSC")) and a paint; and hung the plates in a converting plant of a paper mill producing household papers such as toilet paper, tissue paper, and kitchen towel. Lint was constantly scattered in the air of the converting plant. One month later, all the plates were examined. It was found that a thick lint layer was formed on the iron plate surface that was not painted with the paint mixture containing PSC. In contrast, a small amount of lint adhered to the aluminum plate surface painted with the paint mixture containing PSC. However, no lint was ever observed on the surfaces of the iron and stainless steel plates which were painted with the paint mixture containing PSC.

In another experiment, a plate (300 mm length×300 mm width×2 mm thickness) made of stainless steel of which the surface was painted with a paint mixture containing PSC and acrylic resin curing agent, dried, and then burned using the flame of a handy gas burner. However, the paint mixture was not burnt, and the painted layer containing PSC was unchanged.

Hereinafter, a method for removing lint according to embodiments of the present invention will be described. In the present invention, a structure comprising "a layer", e.g. "a paint layer" or "an underlayer" is not restricted to a structure containing a single layer. Rather, one or more layer(s) may be included, if not stated otherwise.

The paint layer is preferably in direct contact with the painting target. The underlayer is preferably in direct contact with the painting target and the paint layer.

The method of the present invention has the following aspects [1] to [10].

[1] A method for removing lint comprising: Painting a painting target with a paint mixture in which a paint and paper sludge-derived sintered carbonized porous grains are mixed to prevent lint from adhering to the painting target.

[2] The method for removing lint according to [1], wherein the paper sludge-derived sintered carbonized porous grains contain not less than 60% of incombustibles other than combustibles and have a median size D50 of not more than 20 m.

[3] The method for removing lint according to [1] or [2], wherein the painting target is made of iron, stainless steel, aluminum, or brass.

[4] The method for removing lint according to [1] or [2], wherein the painting target is made of stainless steel, aluminum, or brass, and the method includes a pretreatment comprising rubbing the painting target using an industrial nonwoven fabric surface treatment material or any of abrasive papers #20 to #100.

[5] The method for removing lint according to any of [1] to [4] wherein the paint includes an epoxy resin or an acrylic resin curing agent made of methacrylate polymer.

[6] The method for removing lint according to [1] or [2], wherein the painting target is made of stainless steel, and the method includes a pretreatment of rubbing the painting target using an industrial nonwoven fabric surface treatment material or any of abrasive papers #20 to #100; paint the underlayer using only acrylic resin curing agent made of methacrylate polymer and without the use of the paper sludge-derived sintered carbonized porous grains; and subsequently paint the upper layer upon the underlayer using a paint mixture containing the paper sludge-derived sintered carbonized porous grains and an epoxy resin paint.

[7] The method for removing lint according to [6], wherein the underlayer and/or the upper layer can be painted more than once.

[8] The method for removing lint according to any of [1] to [6], wherein the paint mixture is painted more than once.

[9] The method for removing lint according to any of [1] to [8], wherein the paint mixture is diluted with clean water when the paint mixture is a water-based paint, and the paint mixture is diluted with a thinner when the paint mixture is a solvent-based paint.

[10] The method for removing lint according to any of [1] to [9], wherein the painting targets are the metal surfaces of machines/equipment located after the dryer process of a paper machine, machines/equipment in a paper converting process including the printing press, or electric control panels in the papermaking mill.

(PSC)

In addition to the properties described in the claims, the PSC used in the present invention may have one or more of the following properties:

a pH of not less than 8, preferably not less than 10;

an alkalinity equivalent value of 1.0 to 4.0 meq/g (as NaOH), preferably 1.5 to 2.5 meq/g (as NaOH);

a cation exchange capacity of 1.0 to 4.0 meq/g (as $NH_4+$), preferably 1.5 to 3.0 meq/100 g (as $NH_4+$);

an electric conductivity of 50 to 200 μS/cm, preferably 70 to 150 μS/cm;

a water absorption rate of 50 to 200%, preferably 100 to 160% in accordance with JIS C2141;

a specific surface area or 50 to 200 $m^2/g$, preferably 80 to 150 $m^2/g$ in accordance with the BET adsorption method;

a pore volume of not less than 500 $mm^3/g$, preferably not less than 1,000 $mm^3/g$, an average pore radius of 10 to 100 μm, preferably 20 to 60 m;

pores with a radius of not less than 1 μm constituting not less than 50%, preferably not less than 70% of the total pore volume.

The content of PSC in the paint mixture may vary from 1 to 50 wt %, preferably 10 to 40 wt %.

The PSC has a median size D50 of preferably not more than 200 μm, more preferably not more than 100 μm, and even more preferably not more than 20 μm.

The PSC has a volume porosity of preferably not less than 20% and more preferably not less than 50%.

The volume porosity, the pore volume, average pore radius are determined according to JIS R 1655: Test method for pore size distribution of fine ceramics green body by mercury methods.

In an embodiment of the present invention, the PSC used in the paint mixture and the method for removing lint according to the present invention is produced by sintering/carbonizing paper sludge discharged from paper manufacturing mills which use waste paper alone or both waste paper and wood chip, which has the following configuration (Japanese Unexamined Patent Application Publication No. 2013-068459).

(1) Paper sludge discharged from paper manufacturing mills which use waste paper alone or both waste paper and wood chip is processed by sintering/carbonization to form paper sludge-derived sintered carbonized porous grains which have a pH of not less than 8 and preferably not less than 10; an alkalinity equivalent value of 1.0 to 4.0 meq/g (as NaOH) and preferably 1.5 to 2.5 meq/g (as NaOH); a cation exchange capacity of 1.0 to 4.0 meq/100 g (as $NH_{4+}$) and preferably 1.5 to 3.0 meq/100 g (as $NH_{4+}$); an electric conductivity of 70 to 150 S/cm; a potassium content of not less than 0.0003%; an organic content of less than 35%; and an inorganic content of not less than 65%.

(2) The paper sludge has a moisture content of 50% to 85%, and after being pelletized and dried, this paper sludge is sintered and carbonized in a reducing carbonization sintering furnace at a carbonization temperature of 500° C. to 1,300° C., preferably 700° C. to 1,200° C. Furthermore, sintering/carbonization is preferably carried out at 800° C. to 1,100° C.

(3) The sintered/carbonized PSC contains, on oven-dry weight basis, 15% to 35% of combustibles (including carbon), and incombustibles including 0.5% to 3.0% of $TiO_2$, 0.0001% to 0.0005% of $Na_2O$, 0.0001% to 0.0005% of $K_2O$, 15% to 35% of $SiO_2$, 8% to 20% of $Al_2O_3$, 5% to 15% of $Fe_2O_3$, 15% to 40% of CaO, and 1% to 8% of MgO, the total of these and impurities being 100%; and has a water absorption rate of 100% to 160% in accordance with JIS C2141, a specific surface area of 80 to 150 $m^2/g$ in accordance with the BET adsorption method, and an interconnected cell structure.

(4) The PSC has a volume porosity of not less than 70%, a pore volume of not less than 1,000 $mm^3/g$, an average pore radius of 20 to 60 μm, and pores with a radius of not less than 1 μm constituting not less than 70% of the total pore volume, is a mixture of various forms such as spherical, oval, and cylindrical forms with each having an axis length of 1 to 10 mm, and a black color.

As described above, the PSC is a mixture of various forms such as spherical, oval, and cylindrical forms each having an axis length of 1 to 10 mm. In order to paint a metal surface of an equipment, a machine, or the like with PSC, fine particles are necessary. In general, hammer mills are used to grind PSC. The principle is as follows. A raw material is fed from the center of a grinding chamber into a mill, dispersed by the centrifugal force of a rotor, and ground by the impact force of a hammer. Hammer mills are classified into, for example, pin-type, disc-type, plate-type, and swing-type. A modified hammer mill is a fluidized bed counter jet mill, and a feature of this mill lies in the fact that a fluidized bed counter jet is generated by using a classification rotor to realize ultra-fine grinding. A cyclone mill is the one in which a high-speed rotary motor is operated to reversely rotate a first and a second impeller to thereby achieve the ultra-fine grinding function. To realize satisfactory mixing with a paint in terms of painting operation, the median size D50 of PSC particles is preferably in nano-size (not more than 1 μm). However, PSC particles having a median size D50 of not more than 100 μm or not more than 20 m can also be used.

PSC particles with median size D50 of 20 μm and 3 μm were prepared using an ultra-fine grinding cyclone mill. It was found that the specific surface areas of the PSC particles with median size D50 of 20 μm and 3 μm were 1.2 and 1.4 times larger than that of the original PSC, respectively. Moreover, the original PSC, and those with median size D50 of 20 μm, and 3 μm showed the same X-ray diffraction pattern, which had a strong and wide peak at $2\theta=29.44°$, indicating that the degrees of crystallinity of these PSC'S were similar. Therefore, in order to make good mixing paints, PSC particles should not be more than 20 μm in median size D50. For the PSC examined above, the specific surface area was determined using a Belsorp-mini II, MicrotracBEL Corp., and X-ray diffractometry was recorded using a RINT 1100 diffractometer, Rigaku Corporation. The X-ray diffractometer was operated at 40 kV and 30 mA, $2\theta$ in the range of 0° to 60°, at a step size of 0.1°, and at a step time of 5 seconds.

(Iron Surface and Paint)

Three iron plates of the sizes 900 mm (width)×1,800 mm (height)×6 mm (thickness) were employed to test the effect of PSC on the adherence of lint to their surfaces. They were hung for not less than one month in a converting plant of a paper mill producing household papers such as toilet paper, tissue paper, and kitchen towel.

One plate was just plain, i.e. the one was just as when purchased and no painting applied, and its surface was covered with a thick lint layer after one month of trial.

A second one was painted using a mixture of an epoxy resin paint and PSC particles of a median size D50 of 20 m. The surface of this plate was not pretreated with an industrial nonwoven fabric surface treatment material or abrasive paper (hereinafter, referred to as "abrasive paper or the like"). It was found that no lint adhered to its surface even after one month of trial (Table 1).

A third one, of which the surface was not pretreated by abrasive paper or the like, was painted using a mixture of PSC particles of a median size D50 of 20 μm and an acrylic resin curing agent (adhesive binder) made of methacrylate polymer. Similar to the second iron plate, there was no lint observed on the surface of the third one even after one month of trial (Table 1).

The above results suggest that the painting mixture containing PSC particles with either epoxy resin paint or acrylic resin curing agent made of methacrylate polymer would be able to inhibit the adherence of lint onto iron plate surface.

TABLE 1

Inhibitory effect of various paint mixtures against lint adherence onto different metal surfaces

| | Metals | Iron | Stainless steel | Aluminum | Brass | Handrail | Stabilizer |
|---|---|---|---|---|---|---|---|
| Pretreatment | | No | Yes | Yes | Yes | No | Yes |
| Single layer | Epoxy resin paint + PSC | ⊙ | ⊙ | ○ | ○ | ⊙ | ⊙ |
| | Acrylic resin curing agent + PSC | ⊙ | ⊙ | ○ | ○ | | |
| | Acrylic silicone paint + PSC | Δ | Δ | | | | |
| Multiple layers | Epoxy resin paint + PSC Acrylic silicone | Δ | | | | | |
| | Acrylic resin curing agent Epoxy resin paint + PSC | | ⊙ | Δ | Δ | | ⊙ |
| | Acrylic resin curing agent Acrylic silicone paint + PSC | Δ | Δ | | | | |
| | Acrylic silicone paint Epoxy resin paint + PSC | ○ | ○ | | | | |

⊙○: complete inhibition of lint adherence
Δ: weak inhibition of lint adherence

The surface of the iron plate was painted using a mixture containing an acrylic silicone paint and PSC particles. The resulting iron plate was then placed in a household paper converting plant for not less than one month. A thick lint layer was observed on its surface. Similarly, the surface of another iron plate was first painted with a mixture containing epoxy resin paint and PSC particles. This was the underlayer paint. Then, it was painted upon by the upper layer paint using acrylic silicone paint. After hung in the same household paper converting plant for not less than one month, a very thin layer of lint was observed on the iron plate surface. These results suggest that essentially the acrylic silicone paint alone could not solve the lint adherence problem (Table 1). In the above experiments, the blending ratio of PSC was 25% based on the weight of the paint used, and the iron plate surface was painted twice as described.

The above results also implied that lint tends to attach to the acrylic silicone paint rather than to the epoxy resin paint mixed with PSC. Therefore, when these paints are used in combination, the epoxy resin paint mixed with PSC is used as an underlayer paint, and the acrylic silicone paint without PSC as the upper layer. With this configuration, the lint adherence problem can be reduced even when the acrylic silicon paint is used (Table 1).

The surface of the iron plate was painted twice with a paint mixture containing the epoxy resin paint and commercially available activated carbon (Kuraray coal PW-W5A, Kuraray Co., Ltd., median size D50: 20 μm, blending ratio: 25% of weight of paint). The iron plate was then placed in a household paper converting plant for not less than one month. It was observed that the surface of the plate was slightly covered with lint. Thus, PSC is better than the commercial activated carbon tested in terms of lint removal. Note that the median size D50 of PSC was adjusted to 20 μm in the above experiments because both the commercial activated carbon and PSC, have similar deodorant and decoloring properties.

(Stainless steel (SUS304) surface and paint)

Among three stainless steel (SUS 304) plates tested (2,000 mm in length×1,000 mm in width×2 mm in thickness) one plate was hung in a household paper converting plant for not less than one month. Unlike the iron plates tested above, the surfaces of the stainless steel (SUS 304) plates were first treated with abrasive paper or the like to enhance the adhesion of paints. This treatment may also remove foreign matters such as stain and pitch, and thus may improve the attachment of paints onto the plate surface. Note that the surface of the iron plates mentioned above needs no such pretreatment. The painting methods for the surfaces of both iron and stainless steel plates were similar. The results showed that, for the case of single-layer painting, the surface of the stainless steel plate contained no adhered lint when it was painted with a mixture containing PSC and the acrylic resin curing agent made of methacrylate polymer (Table 1). Similar results were also obtained for the stainless steel plate of which its surface was first treated with abrasive paper or the like and then painted using a mixture of epoxy resin paint and PSC (Table 1).

The stainless steel plates mentioned above can also be subjected to double-layer painting. After the pretreatment with abrasive paper or the like, the surface of the stainless steel was first painted with, as the underlayer, acrylic resin curing agent made of methacrylate polymer and without PSC, then painted with, as the upper layer, epoxy resin paint mixed with PSC. This painting method resulted in the same effect of removing lint as that in the single-layer painting method described above (Table 1).

In the case where the stainless steel surface was first pretreated with abrasive paper or the like, then painted with acrylic silicon paint mixed with PSC particles, or in the case where the abrasive paper or the like-pretreated stainless steel surface was painted with, as an underlayer, acrylic resin curing agent made of methacrylate polymer and without PSC particles, and then painted with, as an upper layer, acrylic silicon paint mixed with PSC particles, a lint layer was found on these two surfaces. Thus, the acrylic silicon paint cannot be used to solve the lint problem. This is similar to the case of the iron surface (Table 1). The above experiments were performed under the conditions where the median size D50 of PSC was 20 μm, the PSC blending ratio 25% of the weight of the paint used, the number of painting layers two, and the painted stainless steel plates were placed in a household paper For the stainless steel surface, similar to the case of the iron surface, the acrylic silicon paint that does not mix with PSC particles may be used as an underlayer paint, and the epoxy resin paint mixed with PSC particles may be used as the upper layer paint (Table 1).

(Aluminum Surface, Brass Surface, and Paint)

For each of aluminum surface and brass surface, two metal plates (2,000 mm in length×1,000 mm in width×2 mm in thickness) were used. They were placed in a household paper (toilet paper, tissue paper, kitchen towel etc.) converting plant for not less than one month after painted with different paints. The surfaces of these metal plates were first treated with abrasive paper or the like prior to painting. For a single-layer painting, these surfaces were painted using the paint mixture containing PSC particles and acrylic resin curing agent made of methacrylate polymer. The results showed that lint was slightly attached to the surfaces, and thus the effect was slightly inferior to that of the stainless steel (SUS 304) surface painted with the same kind of paint mixture. However, this configuration can be used to lessen the lint problem in the pulp and paper industry (Table 1). Furthermore, similar results were obtained for these metal surfaces after they were painted with the paint mixture containing epoxy resin paint and PSC particles. Surely, these metal surfaces were already pretreated using abrasive paper or the like (Table 1).

After pretreated with abrasive paper or the like, the surfaces of each of the aluminum plate and the brass plate were painted with acrylic resin curing agent made of methacrylate polymer without mixing with PSC particles. This is the underlayer paint. Upon these underlayers were the upper layer paints painted with epoxy resin paint mixed with PSC particles. A thin layer of lint was observed on each plate surface tested. Thus, it would be difficult to use these configurations to solve the lint problem (Table 1). The above experiments were performed under the conditions where the median size D50 of PSC was 20 μm, the PSC blending ratio 25% of the weight of the paint used, the number of times of coating two, and the painted aluminum and brass plates were placed in a household paper converting plant for not less than one month.

DETAILED DESCRIPTION OF EMBODIMENTS

Experiments described in Examples and Reference Examples were carried out in the household paper converting plant where toilet paper, tissue paper, kitchen towel, and the like were manufactured. The mill housed the household paper converting plant is also comprised of a plant producing deinked pulp from waste paper, a Yankee paper machine, and an effluent treatment plant. Observedly, the air in the converting plant is constantly filled with lint.

Example 1 and Reference Example 1 of Steel Pipe Handrail Already Covered with a White Color Paint A steel pipe handrail on the second floor of the household paper converting plant mentioned above was employed. The handrail was composed of four steel pipes painted with while color. The outer diameter of each pipe was 35 mm and each steel pipe parallel to the ground surface. A portion having a length of 18 μm on each steel pipe was selected for the test. Thus, the total length used was 72 μm (18 m/pipe×4 pipes). The lint attached to these selected portions were carefully and completely wiped off using laboratory paper wipe.

Example 1-1

In the first step of the test, the first portions on each pipe with a length of 6.24 μm each, were painted twice with a paint mixture containing PSC particles (median size D50: 20 μm) and a light-gray epoxy resin paint (Dai Nippon Toryo Co., Ltd., DNT) (PSC blending ratio: 25% by weight of light-gray epoxy resin paint used). The resulting high-viscosity paint was subsequently diluted with xylene (Kansai Paint Co., Ltd.) before use.

Note that PSC can be blended in an amount of up to 100% by weight of the epoxy resin paint or the acrylic resin curing agent made of methacrylate polymer, each being used separately. As a result, the viscosity of the resulting paint may increase greatly. In such a case, the paint is diluted either with clean water for the water-based paint, or with a thinner such as xylene or toluene for the solvent-based paint.

Reference Example 1-1

In the second step of the test, pipes portions with a length of 3.65 μm each and located next to those already painted and described in the first step of the test, were not painted at all and used as the reference.

Example 1-2

In the third step of the test, pipes portions with a length of 3.76 μm each and situated next to the portions of the second step of the test, were painted twice with a paint mixture of PSC particles and a light-gray epoxy resin paint (Dai Nippon Toryo Co., Ltd., DNT).

Reference Example 1-2

In the fourth step of the test, as in the second step, pipes portions with a length of 4.35 μm each and located next to the portions of the third step of the test, were not painted and used as the reference.

Eighteen days later, lint adhered to each pipe portion of each step of the test was carefully and completely wiped off using laboratory paper wipe and stored in polyethylene bags and weighed. The results are given in Table 2.

TABLE 2

[Amounts of lint attached during the 18 days test to portions of the steel pipes handrails painted with a mixture of PSC particles and a light-gray epoxy resin paint, and to portions without painting]

|  | Step in experiment | | | |
| --- | --- | --- | --- | --- |
|  | Step 1 | Step 3 | Step 2 | Step 4 |
| Painting | Yes | Yes | No | No |
| Total length (m) | 24.96 | 14.60 | 15.04 | 17.40 |
| Amount of lint (g) | 4.252 | 2.266 | 5.187 | 6.026 |
| Lint (g/m) | 0.170 | 0.155 | 0.395 | 0.346 |
| Lint average (g/m) | 0.163 | | 0.371 | |
| Lint average (g/m/D) | 0.009 | | 0.021 | |

The above results showed that the amount of the lint attached to the portions of the handrails painted with the mixture of PSC particles and epoxy resin paint was 0.009 g/m/D and that adhered to the unpainted portions, 0.021 g/m/D. Thus, there was a decrease of 57% of the lint amount attached the pipes portions painted with the paint mixture containing PSC particles.

Example 2 and Reference Example 2 of Stainless Steel Stabilizers Located after the Yankee Paper Machine Producing Tissue Papers)

In the household paper manufacturing mill mentioned above, a large amount of lint is generated in the Yankee paper machine process and accumulates on the surfaces of stabilizers positioned after the Yankee dryer. As the weight of the accumulated lint increases, it then falls onto the paper web that passes under these stabilizers, resulting in numerous breakages of the paper web. As a result, the operation is interrupted, and the production efficiency decreases.

Example 2

A test was conducted using the stabilizers positioned just after the Yankee dryer. Since the surface of the stabilizers was made of stainless steel it was lightly and uniformly rubbed with abrasive paper #40 prior to its painting. Subsequently, the surface was painted with, as an underlayer, the acrylic resin curing agent made of methacrylate polymer and without PSC particles. It was then painted three times with, as an upper layer, a mixture containing PSC particles (median size D50: 3 μm) and a light-gray epoxy resin paint (PSC particle blending ratio: 30% of the weight of the paint used) and diluted with xylene.

The paper breakages were recorded continuously for 15 days and the results are given in Table 3. Similar to the Reference Example 2, the basis weight of the tissue paper produced was also in the range of 11 to 13 g/m².

Reference Example 2

The Yankee paper machine tested produces solely tissue paper of low basis weight of 11 to 13 g/m². Consequently, daily paper breakages occur very often. During the 15 days prior to the commencement of the trial, the number of the paper breakages was recorded and tabulated in Table 3.

The test results indicate that whereas the average daily paper breakages of the Reference Example 2 were 2.3 times/day, those of the stabilizers painted with the mixture of PSC particles and epoxy resin paint in Example 2 0.3 times/day, or a decrease of 87%.

TABLE 3

[Reduction of paper breakages of a Yankee paper machine after painting stabilizers located after the Yankee dryer with a mixture of paint and PSC particles]

| | The number of paper breakages on the Yankee paper machine (times/day) | |
| --- | --- | --- |
| Day | Painting with PSC | Without painting |
| 1 | 2 | 3 |
| 2 | 0 | 4 |
| 3 | 1 | 2 |
| 4 | 1 | 1 |
| 5 | 0 | 2 |
| 6 | 0 | 3 |
| 7 | 0 | 2 |
| 8 | 0 | 4 |
| 9 | 0 | 1 |
| 10 | 0 | 2 |
| 11 | 0 | 2 |
| 12 | 0 | 3 |
| 13 | 0 | 2 |
| 14 | 0 | 3 |
| 15 | 0 | 1 |
| Average | 0.3 | 2.3 |

The results of Examples 1 and 2 described above demonstrate that for a household paper manufacturing mill, painting the surface of the stabilizers positioned after the Yankee paper machine with a paint mixture containing PSC particles reduced the paper breakages. Similar results were obtained for the decreased amount of lint accumulated on the steel pipe handrails located in a household paper converting plant making toilet paper, tissue paper, kitchen towel, and the like. The handrails were also painted with a paint mixture containing PSC particles.

Thus, it may be inferred that piling and sticking troubles due to lint occurred in the offset printing of newsprint, corrugated board paper, paperboard, and the like, or the troubles originated from lint at the printing press and the transfer path of fine paper in roll form or side end of cut-sizes can be greatly improved by painting the surfaces of equipment of the transfer path, conveyer or the printing press using a paint mixed with PSC particles.

Furthermore, malfunction or fire break out of the corrugator of corrugated boards, and short circuit of, or fire break at the electric control panel in a household paper manufacturing mill, all due to the lint accumulation, can be prevented by painting the surfaces of the corrugator or the inner and outer surfaces of the electric control panel using a paint mixed with PSC particles.

Lint does not adhere to the surfaces of equipment and machines painted with the paint mixture mixed with PSC particles. Accordingly, lint does not gather or accumulate in the equipment and the machines. Thus, gaps, spaces, and the like can be formed on compressed air hoses, compressed air flows, or the likes, or the equipment and the machines.

The insides and outsides of bottomless electric control panels installed in paper making mill with paper machines, and in paper converting plant equipped with printing press are painted with a paint mixed with PSC particles.

What is claimed is:

1. A paint mixture comprising a paint and paper sludge-derived sintered carbonized porous grains;
   wherein the paper sludge-derived sintered carbonized porous grains contain 5 to 40 wt %, on a dry weight basis, of combustibles including carbon and 60 to 95 wt %, on a dry weight basis, of incombustibles, have a median size D50 of not more than 100 μm and a volume porosity of not less than 50% and are obtainable by sintering and carbonizing a paper sludge in a reducing carbonization sintering furnace at a carbonization temperature of 500° C. to 1,300° C.

2. The paint mixture according to claim 1, wherein the paper sludge-derived sintered carbonized porous grains contain 15 to 40 wt %, on a dry weight basis, of combustibles including carbon and 60 to 85 wt %, on a dry weight basis, of incombustibles, have a median size D50 of not more than 20 μm and a volume porosity of not less than 70% and are obtainable by sintering and carbonizing a paper sludge in a reducing carbonization sintering furnace at a carbonization temperature of 500° C. to 1,300° C.

3. The paint mixture according to claim 1, wherein the paint includes an epoxy resin or an acrylic resin curing agent made of methacrylate polymer.

4. A composite structure comprising a painting target and a paint layer containing a paint mixture as described in claim 1.

5. The composite structure according to claim 4, wherein the painting target is made of iron, stainless steel, aluminum, or brass.

6. The composite structure according to claim 4, wherein the painting target is a metal surface of a machine or equipment located after the dryer process of a paper machine, a machine or equipment in a paper converting process including the printing press, or electric control panels in the papermaking mill.

7. The composite structure according to claim 4, comprising an underlayer between the painting target and the paint layer, wherein the underlayer does not contain the paper sludge-derived sintered carbonized porous grains.

8. The composite structure according to claim 7, wherein the painting target is made of stainless steel, the underlayer is obtainable by using only acrylic resin curing agent made of methacrylate polymer, and the paint layer is obtainable by using a paint mixture containing an epoxy resin paint.

9. The composite structure according to claim 4, wherein the painting target has been pretreated by rubbing the painting target using an industrial nonwoven fabric surface treatment material or any of abrasive papers #20 to #100.

10. A method of using a paint mixture of claim 1 comprising preventing lint from adhering to a paint target by applying the paint mixture to the paint target.

11. A method for removing lint comprising painting a painting target with a paint mixture as described in claim 1 to prevent lint from adhering to the painting target.

12. The method for removing lint according to claim 11, wherein a composite structure comprising the painting target and a paint layer containing the paint mixture is obtained.

13. The method for removing lint according to claim 11, wherein the painting target is made of stainless steel, aluminum, or brass, and the method includes a pretreatment comprising rubbing the painting target using an industrial nonwoven fabric surface treatment material or any of abrasive papers #20 to #100.

14. The method for removing lint according to claim 11, wherein the painting target is made of stainless steel, and the method includes a pretreatment of rubbing the painting target with an industrial nonwoven fabric surface treatment material or any of abrasive papers #20 to #100; painting the underlayer using only acrylic resin curing agent made of methacrylate polymer; and subsequently painting the paint mixture on the underlayer.

15. The paint mixture according to claim 2, wherein the paint includes an epoxy resin or an acrylic resin curing agent made of methacrylate polymer.

16. A composite structure comprising a painting target and a paint layer containing a paint mixture as described in claim 2, wherein the painting target is made of iron, stainless steel, aluminum, or brass.

17. A composite structure comprising a painting target and a paint layer containing a paint mixture as described in claim 3, wherein the painting target is made of iron, stainless steel, aluminum, or brass.

18. A composite structure comprising a painting target and a paint layer containing a paint mixture as described in claim 15, wherein the painting target is made of iron, stainless steel, aluminum, or brass.

19. A painting mixture consisting of a paint and paper sludge-derived sintered carbonized porous grains.

* * * * *